Figure 1:
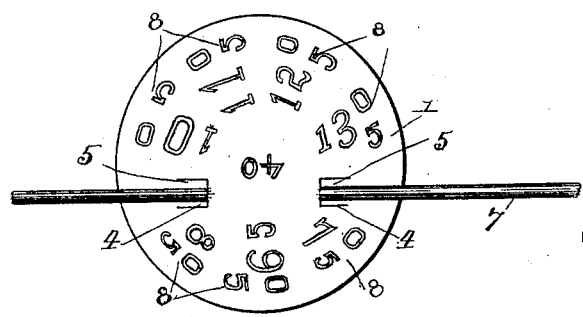

No. 836,433.

PATENTED NOV. 20, 1906.

H. P. CANNON.
TAG.
APPLICATION FILED APR. 25, 1905. RENEWED SEPT. 17, 1906.

Witnesses.

Inventor:
H. P. Cannon.
By
Attorneys.

UNITED STATES PATENT OFFICE.

HENRY P. CANNON, OF CANONSBURG, PENNSYLVANIA.

TAG.

No. 836,433.     Specification of Letters Patent.     Patented Nov. 20, 1906.

Application filed April 25, 1905. Renewed September 17, 1906. Serial No. 334,981.

*To all whom it may concern:*

Be it known that I, HENRY P. CANNON, a citizen of the United States of America, residing at Canonsburg, in the county of Washington and State of Pennsylvania, have invented certain new and useful Improvements in Tags, of which the following is a specification, reference being had therein to the accompanying drawings.

This invention relates to certain new and useful improvements in tags; and the object of the invention is to provide a metallic tag particularly adapted for marking bales of hay, straw, and the like.

Another object of the invention is to provide a novel form of metallic tag which can be easily and quickly applied to a bale, and retained in position upon said bale, whereby its marked surface will at all times be visible.

A further object of the invention is to provide a tag having a plurality of numbers arranged thereon, the numbers being arranged in different combinations, whereby any desired number can be selected and punched to represent the weight of the bale to which the tag is attached or the numerical arrangement of the bale when stored.

A still further object of this invention is to provide a tag which will be extremely simple in construction, strong and durable, comparatively inexpensive to manufacture, and highly efficient for the purposes for which it is used.

The tag is adapted to be used in connection with bales; but I do not care to confine myself to this specific use, as the tag is applicable to express packages and boxes, where the designation of the packages is represented by numbers.

With the above and other objects in view the invention consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 2:
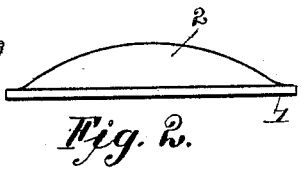
Figure 3:
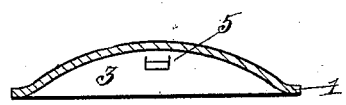
Figure 4:
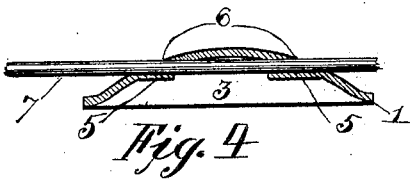
Figure 5:
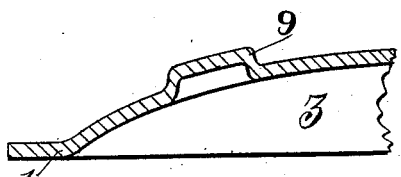
Figure 6:
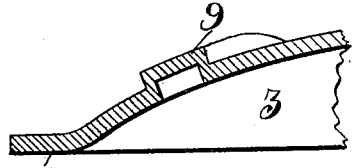
Figure 7:
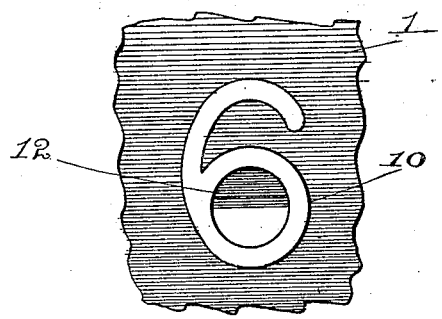
Figure 8:
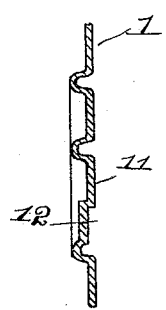
Figure 9:
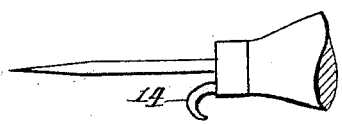

Figure 1 is a plan view of my improved tag. Fig. 2 is an edge view of the tag-blank. Fig. 3 is a transverse sectional view of a tag-blank, illustrating the next step in the manufacture of the tags. Fig. 4 is a longitudinal sectional view of the tag, illustrating means employed for securing the same to a bale. Fig. 5 is a fragmentary sectional view of a tag, upon an enlarged scale, illustrating the formation of the numbers thereon. Fig. 6 is a similar view illustrating a construction employed in connection with some of the numerals arranged upon the tag. Fig. 7 is an enlarged fragmentary top plan view of a tag, illustrating one of the raised numerals constructed in accordance with my invention. Fig. 8 is a vertical sectional view of the same, and Fig. 9 is a detail side elevation view of an awl employed for punching the tags and arranging the same.

To put my invention into practice, I preferably construct my improved tags of a light and durable metal, such as tin, and the tags are preferably stamped from sheets of metal in the form of disks. The disks are then submitted to a suitable stamping machine or press, where they are bent to form a central raised portion, upon which numbers are adapted to be arranged.

The disk 1 is provided with a central raised portion 2, forming a concavity 3. The curved or oval surface of the disk is sheared, as indicated at 4 4, providing diametrically-opposed tongues 5 5. These tongues are preferably formed to one side of the diameter of the disk, the object of which will be presently described. The tongues 5 5 are adapted to be bent downwardly within the concavity 3 of the tag, providing horizontally-alined openings 6 6, through which a wire 7 is adapted to pass, this wire representing the ordinary type of wire used for binding hay, straw, or excelsior bales. The tags are adapted to be placed upon the wire 7 employed for binding the bale, and in order that the tag will always be in position to lie snugly in engagement with the bale I have formed the openings 6 6 to one side of the tag. Consequently when the tag is suspended upon the wire 7 it will always hang vertically on account of the one side of the tag being heavier than the other side.

In stamping the tag I provide the dies employed with suitable numerals, which are adapted to form, emboss, or raise the suface of the tag. The numerals placed upon my improved tag are arranged in the following manner: Circumferentially arranged upon the tag are sets of numbers "8," these numbers being "5" and "0." Opposite each set of numbers and arranged radially toward the center of the disk are the numbers "7," "8," "9," "10," "11," "12," "13," which are preferably formed of larger numerals than the sets 8. Approximately central of the disk I provide the number "40," and opposite the number "9" I place an inverted "5," which, together with the "9," (in an inverted position,) may read "65."

The numbers upon the tag are adapted to represent the different weights of bales in connection with which my improved tag may be used, and the arrangement of the numbers is adapted to increase the adaptability of the tag to various sizes of bales.

In constructing the numerals I preferably emboss or stamp the disk 1, whereby the numerals will be raised, and the formation of some of the numerals will facilitate their punching, whereby the tag can be marked. In Figs. 5 to 8, inclusive, of the drawings I have illustrated, upon an enlarged scale, the formation of the numerals, and in forming the numerals "1" and "7" the material embodied in the disk is simply embossed or raised, as indicated by the reference-numeral 9 in Fig. 5 of the drawings. The formation of the numerals having open loops or curved ends is slightly different from the numerals "1" and "7," and by referring to Figs. 7 and 8 it will be observed that I have illustrated the numeral "6" having a loop or circular portion 10. To facilitate the punching of the numerals and prevent the numerals from becoming obliterated by the instrument in punching, I form a portion of the countersunk portion 11 of the numeral with a slightly-elevated portion 12, this elevated portion 12 being stamped or pressed, whereby its edges will present an abrupt edge adapted to break or snap when punched by a suitable instrument. In Fig. 9 of the drawings I have illustrated an awl which can be conveniently employed for punching the desired numeral, and a convenient adjunct to the awl is designated by the reference-numeral 14. The awl, which is adapted to be used by balers or in connection with my improved tags is preferably provided with the hook illustrated in Fig. 9, whereby the end of the hook can be placed in engagement with the wire 7 should it be necessary to move the wire outwardly from the bale in order to turn the tag should the embossed face of the tag be turned toward the bale.

When the tag is used in connection with a bale of straw or excelsior weighing one hundred and twenty pounds, the "0" opposite "12" is punched. Should the bale weigh one hundred and twenty-five pounds, the "5" opposite the "12" is punched, this being true in connection with each set of numerals and their corresponding radially-disposed numerals.

I do not care to confine myself to any prescribed type of instrument employed for punching my improved tags, nor do I care to confine the use of my improved tag to bales, as the same is applicable to express-packages used and transmitted by railroad companies to various places which are designated in the railroad service by numbers.

It will be noted that my improved tag is calculated to be used for a great number of weights beyond the number arranged on the tag without increasing the numerals upon the tag. For example, the tag shows an arrangement whereby the weights may be shown in multiples of five from sixty-five to one hundred and thirty-five pounds. Now in order to show one hundred and forty pounds I have arranged the tag in such a manner that by punching the "100" mark and the "40" mark the two sums will register one hundred and forty pounds. In order to show one hundred and forty-five pounds, the "105" mark and the "40" mark are punched, and so on. Two or more sums may be punched to designate the aggregate of the entire weight. It will be seen that by this arrangement the weight may be easily calculated and only a comparatively few numbers will be shown on the tag.

What I claim, and desire to secure by Letters Patent, is—

1. A tag of the character described consisting of a disk having a central raised portion, said raised portion being sheared at opposite points to form openings, a plurality of circumferentially-arranged numerals embossed upon said raised portion, some of said numerals having intermediate raised portions, substantially as described.

2. A tag of the character described consisting of a disk having a central raised portion and a plurality of numerals embossed upon said raised portion, some of said numerals having intermediate raised portions.

In testimony whereof I affix my signature in the presence of two witnesses.

HENRY P. CANNON.

Witnesses:
 HENRY C. EVERT,
 E. E. POTTER.